(12) United States Patent
Hein

(10) Patent No.: US 9,211,950 B2
(45) Date of Patent: Dec. 15, 2015

(54) MULTI-ELEMENT ROTOR BLADE

(75) Inventor: Benjamin Reed Hein, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 938 days.

(21) Appl. No.: 13/464,162

(22) Filed: May 4, 2012

(65) Prior Publication Data
US 2013/0294914 A1    Nov. 7, 2013

(51) Int. Cl.
*F04D 29/34* (2006.01)
*B64C 27/48* (2006.01)
*B64C 27/615* (2006.01)
*B64C 27/72* (2006.01)

(52) U.S. Cl.
CPC ............ *B64C 27/48* (2013.01); *B64C 27/615* (2013.01); *B64C 27/72* (2013.01); *B64C 2027/7266* (2013.01); *Y02T 50/34* (2013.01)

(58) Field of Classification Search
CPC ............ F01D 5/027; B64C 2027/7261; B64C 2027/7266; B64C 2027/7272; B64C 2027/7288; B64C 2027/7294
USPC .......... 416/1, 23, 24, 98; 244/17.11, 210–217
See application file for complete search history.

(56) References Cited

U.S. PATENT DOCUMENTS

| | | | | |
|---|---|---|---|---|
| 1,742,792 | A | * | 1/1930 | Stahl .................... 416/200 R |
| 2,716,460 | A | | 8/1955 | Young |
| 4,222,242 | A | * | 9/1980 | Moseley .................... 60/698 |
| 4,360,176 | A | | 11/1982 | Brown |
| 4,422,606 | A | | 12/1983 | Munroe |
| 5,409,183 | A | * | 4/1995 | Gunsallus ............ 244/17.13 |
| 6,666,648 | B2 | | 12/2003 | Bernhard et al. |
| 6,769,872 | B2 | * | 8/2004 | Torok et al. .................. 416/1 |
| 6,840,741 | B1 | | 1/2005 | Wake et al. |
| 6,932,569 | B2 | | 8/2005 | Torok et al. |
| 7,594,625 | B2 | | 9/2009 | Robertson et al. |

FOREIGN PATENT DOCUMENTS

| | | |
|---|---|---|
| FR | 868814 A | 1/1942 |
| GB | 460513 A | 1/1937 |
| WO | 2004067380 A1 | 8/2004 |
| WO | 2011099276 A1 | 8/2011 |

* cited by examiner

*Primary Examiner* — Igor Kershteyn
*Assistant Examiner* — Woody A Lee, Jr.
(74) *Attorney, Agent, or Firm* — Cantor Colburn LLP

(57) ABSTRACT

A main rotor assembly for a rotary wing aircraft includes a blade assembly secured to a rotor hub. The blade assembly includes a rotor blade and a slat positioned to define a slat gap between the rotor blade and the slat. One or more struts extend from the rotor blade to the slat to position the slat and control motion of the slat. The rotor blade and the slat are secured to a common rotor cuff such that the rotor cuff acts as a centrifugal force support.

12 Claims, 3 Drawing Sheets

MULTI-ELEMENT ROTOR BLADE

BACKGROUND OF THE INVENTION

The subject matter disclosed herein relates to rotor blades. More specifically, the subject disclosure relates to multi-element airfoil rotor blades.

Multi-element airfoils are commonly used on fixed wing aircraft, and are commonly incorporated as leading edge or trailing edge slats. The slats are extended or articulated under certain flight conditions, such as high angle of attack and low Mach number, and are typically retracted under other conditions.

Multi-element airfoils are known in rotors of rotary-winged aircraft. Slats, which are located at a rotor blade leading edge, similar to those utilized on fixed wings, increase the maximum lift coefficient of the rotor blade, when compared to a rotor blade without slats. Increased maximum lift coefficient enables the rotor to achieve greater thrust and/or increased flight speeds. Such improvements favorably impact the payload/ range capabilities and maneuverability, and reduce rotor tip speeds leading to a reduction in noise signatures for the rotary-winged aircraft.

Struts connecting these slats to the main portion of the rotor blade, however, must typically be designed to withstand both the lifting forces on the slats and centrifugal forces generated by the rotation of the rotor about its axis. The resulting struts generate high levels of parasitic drag, which reduces the beneficial effects of the slats.

BRIEF DESCRIPTION OF THE INVENTION

According to one aspect of the invention, a main rotor assembly for a rotary wing aircraft includes a blade assembly secured to a rotor hub. The blade assembly includes a rotor blade and a slat positioned to define a slat gap between the rotor blade and the slat. One or more struts extend from the rotor blade to the slat to position the slat and to control motion of the slat. The rotor blade and the slat are secured to a common rotor cuff such that the rotor cuff acts as a centrifugal force support.

According to another aspect of the invention, an strut system for a multi-element rotor blade includes an actuator disposed at a main element of the multi-element rotor blade and a strut operably connected to the actuator and a slat of the multi-element rotor blade, to control motion of the slat relative to the main element. A slat pitch bearing operably connects the actuator to the strut, defining an axis about which the slat locally rotates relative to the main element and a journal bearing connects the slat to the strut allowing relative motion in a radial direction between the slat and the main element of the multi-element rotor blade to prevent transmission of edgewise bending loads into the strut.

According to yet another aspect of the invention, a rotary-winged aircraft includes an airframe and a rotor assembly operably connected to the airframe. The rotor assembly rotor includes a blade assembly secured to a rotor hub. The blade assembly includes a rotor blade and a slat positioned to define a slat gap between the rotor blade and the slat. One or more struts extend from the rotor blade to the slat to position the slat and to control motion of the slat. The rotor blade and the slat are secured to a common rotor cuff such that the rotor cuff acts as a centrifugal force support.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
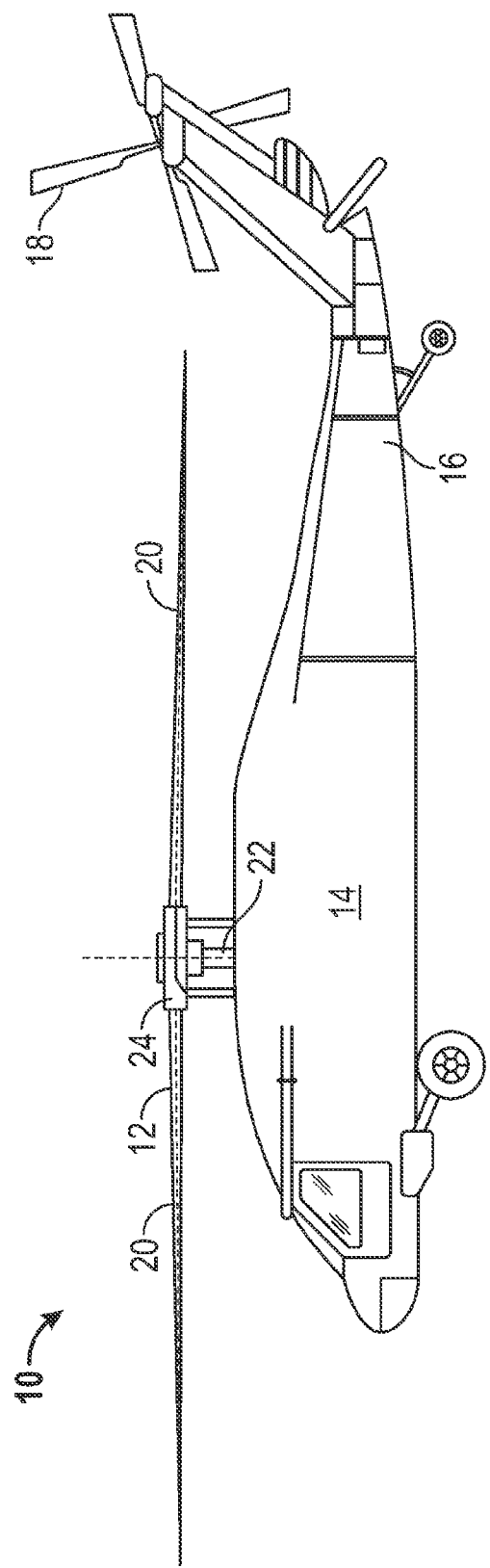
FIG. 1 is a schematic view of an embodiment of a helicopter.

Shown in FIG. 1 is a schematic of a rotary wing aircraft, in this embodiment, a helicopter 10. The helicopter 10 includes a main rotor assembly 12, and an airframe 14 having an extending tail 16 at which is mounted an anti-torque rotor 18. Although the aircraft illustrated is a helicopter 10, it is to be appreciated that other machines, such as turbo props or tilt-rotor aircraft or coaxial or tandem rotor helicopters may also benefit from the system of the present disclosure. The main rotor assembly 12 includes a plurality of blade assemblies 20 located about a rotor shaft 22 via a rotor hub assembly 24.

Figure 2:
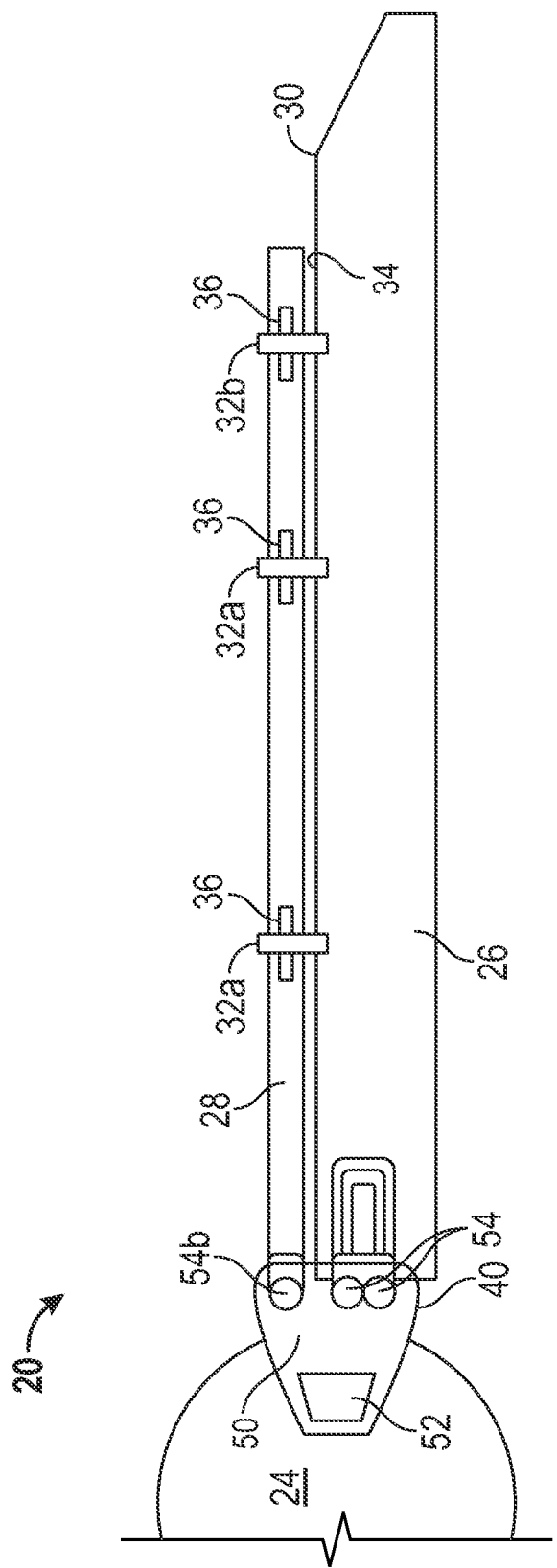
FIG. 2 is a plan view of an embodiment of a rotor blade for a helicopter.

Referring now to FIG. 2, each blade assembly 20 includes a rotor blade 26 and a slat 28 located at a leading edge 30 of the rotor blade 26. The slat 28 is an aerodynamic feature, which may have an airfoil-shaped cross-section, located at the leading edge 30 to improve aerodynamic performance of the blade assembly 20 and thus the helicopter 10. The slat 28 is secured to the rotor blade 26 via one or more struts 32 extending from the slat 28 to the rotor blade 20, defining a slat gap, or slot 34 between the slat 28 and the rotor blade 26. In some embodiments, the struts 32 include one or more passive struts 32a and an active strut 32b.

Figure 3:
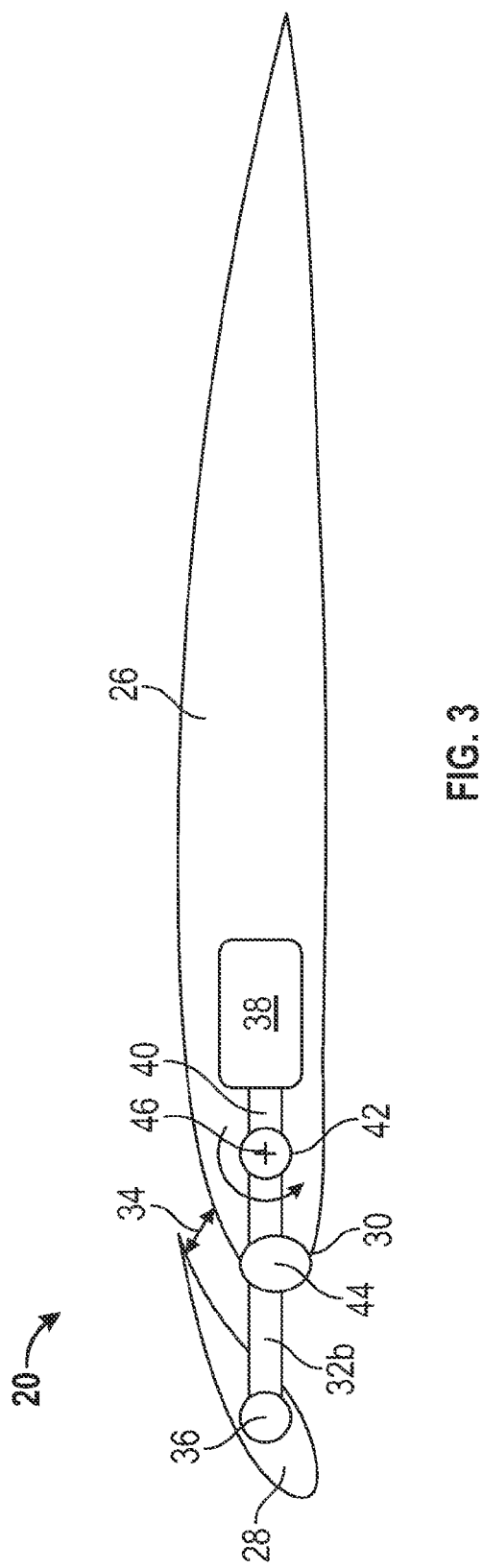
FIG. 3 is a cross-sectional view of an embodiment of a rotor blade.

As shown best in FIG. 3, the active strut 32b extends through the leading edge 30 of the rotor blade 26, and is connected to the slat 28 via a slat bearing, which may be a journal bearing 36. Journal bearings 36 connect both the passive struts 32a and active strut 32b to the slat 28, and support lift, drag and rotational moments, but allow relative motion in a radial direction between the struts 32a and 32b and the slat 28 to prevent transmission of edgewise bending loads, and centrifugal forces through the struts 32a and 32b. The passive struts 32a may similarly extend through the leading edge 30 of the rotor blade 26, or may be bonded or otherwise secured to an exterior surface of the rotor blade 26. Further, the active strut 32b is connected to an actuator 38 disposed in an interior of the rotor blade 26. In some embodiments, there is a direct connection of the active strut 32b to the actuator 38, while in other embodiments, as shown in FIG. 3, one or more linkage members 40 are disposed between the active strut 32b and the actuator 38 to connect the active strut 32b to the actuator 38. One or more slat pitch bearings 42 may be included between the active strut 32b and the linkage members 40. The slat pitch bearing 42 defines an axis 46 about which the slat 28 rotates relative to the rotor blade 26. Further, in some embodiments, an environmental seal 44 is located around the active strut 32b at the leading edge 30 of the rotor blade 26. The seal 44 is a soft, pliable material to allow motion of the active strut 32b relative to the rotor blade 26, while sealing between the active strut 32b and the leading edge 30, to prevent contaminants, foreign particles and fluid, from entering the rotor blade 26 and in some embodiments providing erosion protection at the leading edge 30 of the rotor blade 26. When the actuator 38 is activated, the active strut 32b rotates about axis 46, thereby changing a position of the slat 28 relative to the rotor blade 26 to produce the selected aerodynamic performance characteristics. The strut, bearing and linkage arrangement between the actuator 38 and the slat 28 is configured to restrict motion of the slat 28 relative to the rotor blade 26 in a generally chordwise direction, as well as in lift and drag directions, unless driven by the actuator 38, while not reacting centrifugal forces applied to the slat 28. In other words, unless otherwise restrained, the strut, bearing and linkage arrangement allows relative radial motion between the slat 28 and the rotor blade 26.

Referring again to FIG. 2, the slat 28 extends to a root 48 of the blade assembly 20 and both the rotor blade 26 and the slat 28 are secured to the rotor hub assembly 24, for example, at a rotor cuff 50, a hardpoint location of the rotor hub assembly 24. The rotor cuff 50 is outboard of flapping and lagging joints of the rotor assembly 12, such as that provided by a primary hub bearing 52. The rotor cuff 50 combines centrifugal loads, flatwise bending loads, edgewise bending loads and torsion bending loads radially outboard of the primary hub bearing 52. The rotor blade 26 is secured to the cuff 50 via a main element retention 54(a), for example, one or more bolts, and the slat 28 is secured to the rotor cuff 50 by a secondary element retention 54b, for example, a one or more bolts or other mechanical fasteners extending through the slat 28 and into the rotor cuff 50. A single bolt is shown in FIG. 2, but that quantity is merely exemplary and it is to be appreciated that other bolt quantities may be utilized. Both the rotor blade 26 and the slat 28 are secured to the rotor cuff 50 such that the rotor blade 26 and slat 28 undergo the same rigid body motion, such as flapping and lagging. In some embodiments, the connection at the rotor cuff 50 may be configured with a pivot or swivel or the like to allow rotation of the connection.

The slat 28 is secured to the rotor cuff 50 such that the connection reacts the centrifugal forces acting on the slat 28 during operation of the helicopter 10, and so the centrifugal forces are not transmitted to the struts 32. The rotor cuff 50 in combination with the journal bearing 36 decouple edgewise bending loads between the rotor blade 26 and the slat 28. This isolation of the centrifugal forces from the struts 32 allows the strength in the radial direction, and therefore size, of the struts 32 to be reduced thus reducing parasitic drag on the main rotor assembly 12 due to the struts 32.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A main rotor assembly for a rotary wing aircraft comprising:
 a blade assembly secured to a rotor hub including:
   a rotor blade;
   a slat positioned to define a slat gap between the rotor blade and the slat;
   one or more struts extending from the rotor blade to the slat to position the slat and to control motion of the slat;
   a slat pitch bearing to operably connect the strut to the rotor blade, defining an axis about which the slat locally rotates relative to the rotor blade; and
   a journal bearing connecting the slat to the strut allowing relative motion in a radial direction between the slat and the rotor blade to prevent transmission of edgewise bending loads into the strut; and
   a rotor cuff to connect the blade assembly to the rotor hub, the rotor blade secured to the rotor cuff at a main element retention, the slat secured to the rotor cuff at a separate secondary element retention.

2. The main rotor assembly of claim 1, wherein the rotor cuff supports slat centrifugal forces, thereby decoupling the centrifugal forces from the struts.

3. The main rotor assembly of claim 1, wherein the one or more struts includes one or more active struts operably connected to one or more actuators to control motion of the slat relative to the main element.

4. An strut system for a multi-element rotor blade comprising:
 an actuator disposed at a main element of the multi-element rotor blade;
 a strut operably connected to the actuator and a slat of the multi-element rotor blade, to control motion of the slat relative to the main element;
 a slat pitch bearing to operably connect the actuator to the strut, defining an axis about which the slat locally rotates relative to the main element; and
 a journal bearing connecting the slat to the strut allowing relative motion in a radial direction between the slat and the main element of the multi-element rotor blade to prevent transmission of edgewise bending loads into the strut, the main element secured to a rotor cuff at a main element retention, the slat separately secured to the rotor cuff at a secondary element retention.

5. The strut system of claim 4, wherein an actuator linkage operably connects the actuator to the strut.

6. The strut system of claim 4, further comprising a sealing element to seal between the strut and the main element.

7. The strut system of claim 6, wherein the sealing element allows for strut motion while providing erosion protection at a leading edge of the main element.

8. The strut system of claim 4, wherein the strut is configured to react slat lift, drag and rotational moments.

9. The strut system of claim 4, wherein the journal bearing is configured to prevent transmission of edgewise bending moments into the active strut system.

10. A rotary-winged aircraft comprising:
 an airframe; and
 a rotor assembly operably connected to the airframe including:
   a rotor blade;
   a slat positioned to define a slat gap between the rotor blade and the slat;
   one or more struts extending from the rotor blade to the slat to position the slat and to control motion of the slat;
   a slat pitch bearing to operably connect the strut to the rotor blade, defining an axis about which the slat locally rotates relative to the rotor blade; and
   a journal bearing connecting the slat to the strut allowing relative motion in a radial direction between the slat and the rotor blade to prevent transmission of edgewise bending loads into the strut; and a rotor cuff to connect the blade assembly to the rotor hub, the rotor blade secured to the rotor cuff at a main element retention, the slat secured to the rotor cuff at a separate secondary element retention.

11. The aircraft of claim 10, wherein the rotor cuff supports slat centrifugal forces, thereby decoupling the centrifugal forces from the struts.

12. The aircraft of claim 10, wherein the one or more struts includes one or more active struts operably connected to one or more actuators to control motion of the slat relative to the main element.

\* \* \* \* \*